(12) United States Patent
Tao et al.

(10) Patent No.: US 9,288,879 B2
(45) Date of Patent: Mar. 15, 2016

(54) LAMP DEVICE AND A METHOD FOR OPERATING A LAMP DEVICE

(71) Applicant: KONINKLIJKE PHILIPS N.V., Eindhoven (NL)

(72) Inventors: Haimin Tao, Eindhoven (NL); Shrek Wang, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/390,072

(22) PCT Filed: Mar. 27, 2013

(86) PCT No.: PCT/IB2013/052431
§ 371 (c)(1),
(2) Date: Oct. 2, 2014

(87) PCT Pub. No.: WO2013/150417
PCT Pub. Date: Oct. 10, 2013

(65) Prior Publication Data
US 2015/0061520 A1 Mar. 5, 2015

Related U.S. Application Data

(60) Provisional application No. 61/619,518, filed on Apr. 3, 2012.

(51) Int. Cl.
*H05B 37/02* (2006.01)
*H05B 33/08* (2006.01)
*F21K 99/00* (2010.01)

(52) U.S. Cl.
CPC ........ *H05B 37/0227* (2013.01); *H05B 33/0806* (2013.01); *H05B 33/0884* (2013.01); *H05B 33/0887* (2013.01); *H05B 37/02* (2013.01); *F21K 9/17* (2013.01); *Y02B 20/383* (2013.01)

(58) Field of Classification Search
CPC ................................. H05B 37/00; H05B 37/02
USPC .......... 315/185 R, 186, 200 R, 291, 294, 297, 315/307, 308
See application file for complete search history.

(56) References Cited

U.S. PATENT DOCUMENTS

| | | | | |
|---|---|---|---|---|
| 4,211,958 A * | 7/1980 | Bickford | ................ | H05B 41/46 307/326 |
| 7,852,011 B2* | 12/2010 | Peng | ......................... | 315/185 R |
| 8,314,564 B2* | 11/2012 | Yu et al. | ..................... | 315/185 R |
| 8,624,509 B2* | 1/2014 | Hartikka et al. | ............... | 315/186 |

(Continued)

FOREIGN PATENT DOCUMENTS

| | | |
|---|---|---|
| CN | 101737664 A | 6/2010 |
| DE | 3806288 A1 | 9/1989 |

(Continued)

*Primary Examiner* — Tung X Le

(57) ABSTRACT

According to one embodiment there is provided a lamp device (1) having a lighting module (3) and two pairs of external connection pins (5aa, 5ab, 5ba, 5bb) for connecting the lamp device to a supply voltage of a lighting fixture. A first terminal of the lighting module is connected to a pin of a first pair of pins by a switch which is closed in response to a voltage difference between both the pins of the first pair of pins and the pins of the second pair of pins exceeding a respective threshold voltage. The lamp is therefore safe to handle even in a condition where one pair of pins is connected and the other is not.

20 Claims, 2 Drawing Sheets

(56) References Cited

U.S. PATENT DOCUMENTS

2010/0020574 A1 1/2010 Ko
2011/0149563 A1* 6/2011 Hsia .................. F21V 25/04
                                                            362/221
2012/0299494 A1* 11/2012 Hartikka .................. 315/201

FOREIGN PATENT DOCUMENTS

| EP | 2366948 | A2 | 9/2011 |
| EP | 2381158 | A2 | 10/2011 |
| EP | 2477456 | A1 | 7/2012 |

* cited by examiner

LAMP DEVICE AND A METHOD FOR OPERATING A LAMP DEVICE

CROSS-REFERENCE TO PRIOR APPLICATIONS

This application is the U.S. National Phase application under 35 U.S.C. §371 of International Application No. PCT/IB13/052431, filed on Mar. 27, 2013, which claims the benefit of U.S. Provisional Patent Application No. 61/619,518, filed on Apr. 3, 2012. These applications are hereby incorporated by reference herein.

FIELD OF THE INVENTION

The present invention generally relates to safety arrangements in lamp devices. More precisely, it relates to a lamp device including circuitry for preventing the occurrence of a potentially harmful voltage at its external connection pins.

BACKGROUND OF THE INVENTION

Conventional tube lamps (fluorescent lamps) of the type having a two-pin connector at each end of the tube are, in steady-state operation, powered by a DC or AC electric current flowing between the connectors. The connectors are electrically disconnected until an arc has been established in the tube. For this purpose, a starting procedure including preheating of the electrodes may be carried out by dedicated starting circuitry, which can be made inherently safe by being enabled only when the lamp is properly inserted into the fixture, so that live electric parts are always protected from touch. The starting circuitry may be of the switch-start/preheat, rapid-start or other type, and is commonly integrated in the lighting fixture.

It is desirable to power a tube lamp retrofit in the same manner as the tube lamp it replaces, that is, by a current flowing between its end connectors. Depending on the internal circuitry of the lamp, potentially hazardous conditions may arise when the lamp is partially inserted or partially removed from the fixture. CN 101737664 A proposes a lamp with a protection switch actuated by an external push button located next to a pair of external connection pins. When the push button is depressed, which normally occurs only at proper insertion of the connection pins into a socket, the protection switch connects one of the pins to the electrical components within the lamp. However, such external push button may be easily tampered with.

SUMMARY OF THE INVENTION

It is an object of the present invention to overcome this problem, and to provide a lamp device which is safe to handle. In particular it is an object to provide a lamp device reducing the risk of electrical shock during insertion in and removal from a lighting fixture.

According to a first aspect of the invention, these and other objects are achieved by a lamp device comprising a lighting module including a first and a second terminal. The lamp device further comprises a first and a second pair of connection pins for connecting the lamp device to a lighting fixture. A first connection pin of the second pair of connection pins is connected to the second terminal. The lamp device further comprises a switch which is operable to connect a first pin of the first pair of connection pins to the first terminal when closed, i.e. in a closed state. The switch is controlled by circuitry of the lamp device. The circuitry is arranged to close the switch in response to a voltage difference between the pins of the first pair of connection pins exceeding a first threshold voltage and a voltage difference between the pins of the second pair of connection pins exceeding a second threshold voltage. It may thus be safe to touch the lamp device even in a condition where one pair of pins is connected and the other is not. More specifically, if only one pair of connection pins is connected to the lighting fixture, e.g. during insertion of the lamp device into a lighting fixture, the switch of the lamp device will be in an open state. A closed current path between the two pairs of connection pins, via the lighting module and its associated terminals, may thereby be avoided. In normal use situations, a non-zero voltage exceeding the first threshold voltage (or the second threshold voltage as the case may be) will only be present when the first (or second) pair of pins is inserted in a supply-voltage socket of a lighting fixture. Hence, the switch will close only when both pairs of pins are inserted into respective sockets at the same time, that is, when neither pair of pins is exposed to touch. Moreover, by controlling the state of the switch on the basis of the voltage difference at both the first and the second pair of connection pins safe handling of the lamp device may be enabled using a single switch. The production costs for the lamp device may thus be limited.

According to one embodiment the circuitry is further arranged to open the switch in response to the voltage difference between the pins of any of the first pair and the second pair falling below a respective threshold voltage. Hence, if one pair of the connection pins are disconnected from the lighting fixture (e.g. during removal of the lamp device from a lighting fixture) the voltage difference between the pins of the disconnected pair will disappear wherein the switch may quickly open. This contributes to safe handling of the lamp device.

The lamp device is suitable for use in a lighting fixture providing a supply voltage between a pin of the first pair and a pin of a second pair, and a voltage between the pins of each of the first pair and the second pair of pins. One type of lighting fixture with such a configuration is a lighting fixture for a fluorescent lamp, i.e. fluorescent tube. The lamp device is particularly suitable for use in a fluorescent tube lighting fixture including a start circuit of a rapid-start type. Such a start circuit may be arranged to provide a voltage for heating filaments at each side of a fluorescent tube. Each of the first pair of pins and the second pair of pins of the lamp device may accordingly be arranged to receive a respective filament heating voltage. The state of the switch of the lamp device (and accordingly the flow of the main current between a pin of the first pair of pins and a pin of the second pair of pins) may thus be controlled on the basis of the filament heating voltages. The lamp device may thus retrofit an existing lighting fixture for a fluorescent lamp, i.e. fluorescent tube.

According to one embodiment the circuitry of the lamp device controlling the switch comprises a control circuit and a circuit element. The circuit element is arranged to provide a control signal to the control circuit in response to the voltage difference between the pins of the second pair exceeding the second threshold voltage. The control circuit is in turn arranged to close the switch in response to the voltage difference between the pins of the first pair exceeding the first threshold voltage at a same time as or while the control signal is received from the circuit element. The control signal may thus be referred to as an enabling signal which together with the voltage difference between the pins of the first pair influences the state of the switch.

The switch and the associated control circuit may be provided in the form of a relay. For safety purposes and ease of implementation the relay may advantageously be a normally-open relay. In other words the relay may be arranged to assume an open state when not energized.

The circuit element providing the control signal referred to above may include a first part arranged to receive a voltage from the second pair of pins and a second part galvanically insulated from the first part and being arranged to provide the control signal to the control circuit. Thereby a flow of charge carriers from the portion of the lamp device including the second pair of pins to the control circuit and the portion of the lamp device including the first pair of pins may be avoided. This may improve the safety of the lamp device.

To enable reliable operation of the lamp device in combination with an AC voltage the lamp device may advantageously include a first rectifier arranged to receive an AC voltage from the first pair of pins and provide a rectified AC voltage to the control circuit. To enable reliable operation of the lamp device for a large range of voltage differences occurring between the pins of the first pair when connected to a lighting fixture the rectifier may provide a rectified AC voltage to the control circuit via a power converter. The power converter may be arranged to receive a first voltage from the outputs of the rectifier and provide a second voltage, which is larger than the first voltage, to the control circuit. Advantageously, the power converter may be arranged to provide the second voltage in response to any first voltage falling within a voltage range.

The lamp device may also comprise a second rectifier arranged to receive an AC voltage from the second pair of pins and provide a rectified AC voltage to the circuit element. In case the circuit element includes the above discussed first and second part, the second rectifier may be arranged to provide the rectified AC voltage to the first part of the circuit element.

The circuit element may for example be an optocoupler. An optocoupler provides a galvanic isolation between the primary side and the secondary side (i.e. the light source and the photodetector). A voltage difference between the pins of the second pair may thus cause the primary side to induce a current forming at the secondary side, the induced current forming a control signal which is provided to the control circuit. An optocoupler may provide a compact implementation of the circuit element.

Alternatively, the circuit element may be a current transformer. A current transformer also provides a galvanic isolation between the primary side (i.e. the primary winding) and the secondary side (i.e. the secondary winding). A current transformer may be a cost-effective implementation of the circuit element. In an embodiment including a current transformer, the lamp device may include a second rectifier arranged to receive an AC voltage from the secondary winding of the current transformer and provide a rectified AC voltage to the control circuit operating the switch. This may simplify implementation of the control circuit since it needs only be arranged to handle a rectified control signal, i.e. a control signal having a single polarity.

According to one embodiment the lamp device further comprises a housing, wherein the lighting module is arranged in the housing and the pins of the first and second pairs of pins extends through the housing. The housing may be electrically isolating. At least a portion of the housing may be light transparent. The electrically active parts of the lamp device may thus be arranged inside the housing, where they are protected from touch. The lamp device may thus be arranged such that the only conductive parts of the lamp device which are accessible from the outside are the first and second pairs of pins. As described above, the design of the lamp device makes also the first and second pairs of pins safe to touch.

In lighting fixtures it may e.g. due to wear and tear occur that one of the contacts in the socket of the lighting fixture into which the lamp device is inserted becomes loose. This may for example happen in older lighting fixtures. As a result a pin of either pair of pins may lose electrical contact with the fixture. Consequently there may be no well-defined voltage difference between the pins of the respective pair. The lamp device may then not operate correctly.

According to one embodiment a lost electrical contact may be handled by including in the lamp device a safety circuit associated with the first or the second rectifier and arranged to close a current path between the outputs of the associated rectifier in response to a voltage difference between the pair of outputs exceeding a set threshold voltage. The safety circuit may thereby provide a bypass path for a main current when a pin looses electrical contact. The safety circuit may clamp the voltage difference between a pair of outputs of the associated rectifier in response to a voltage difference between the pair of outputs exceeding the set threshold voltage. If the lamp device includes a power converter the safety circuit may be arranged to receive a voltage from the outputs of the first rectifier and close a current path between the inputs of the power converter. The closed current path may provide a voltage drop such that the output voltage from the safety circuit (or from the power converter if present) is sufficient for closing the switch. Thereby, the lamp device may produce light even if a pin loses electrical contact with the lighting fixture.

According to another embodiment a lost electrical contact may be handled by a safety circuit associated with the first or second rectifier and arranged to disconnect an output of a pair of outputs of the associated rectifier in response to a voltage difference between the pair of outputs exceeding a set threshold voltage. If the safety circuit is associated with the first rectifier the control circuit may thereby be disconnected from the output of the first rectifier. Analogously if the safety circuit is arranged between the above-mentioned second rectifier and optocoupler, the optocoupler may be disconnected from the output of the second rectifier. Advantageously a safety circuit in accordance with either of the two previous embodiments may be associated with each of the first and the second rectifier.

According to a second aspect of the invention there is provided a method of operating a lamp device comprising a lighting module including a first and a second terminal and a first and a second pair of connection pins for connecting the lamp device to a lighting fixture, wherein a first connection pin of the second pair of pins is connected to the second terminal. According to the method a first voltage difference between the pins of the first pair is monitored. Also a second voltage difference between the pins of the second pair is monitored. In response to the first voltage difference exceeding a first threshold voltage at a same time as the second voltage difference exceeding a second threshold voltage, a first pin of the first pair of pins is connected to the first terminal. The method may further comprise disconnecting the first pin of the first pair of pins from the first terminal in response to a zero voltage at any one of the first and the second pair of pins. The details and advantages discussed in relation to the lamp device of the first aspect apply correspondingly to the method of the second aspect.

Further possible combinations of features are recited in the claims.

BRIEF DESCRIPTION OF THE DRAWINGS

These and other aspects of the present invention will now be described in more detail, with reference to the appended drawings showing embodiments of the invention.

Unless otherwise indicated, like reference numerals refer to like elements throughout.

DETAILED DESCRIPTION

Detailed embodiments will now be described with reference to the accompanying drawings. This invention may, however, be embodied in many different forms and should not be construed as limited to the detailed embodiments set forth herein; rather, these embodiments are provided for thoroughness and completeness, and fully convey the scope of the invention to the skilled person.

Figure 1:
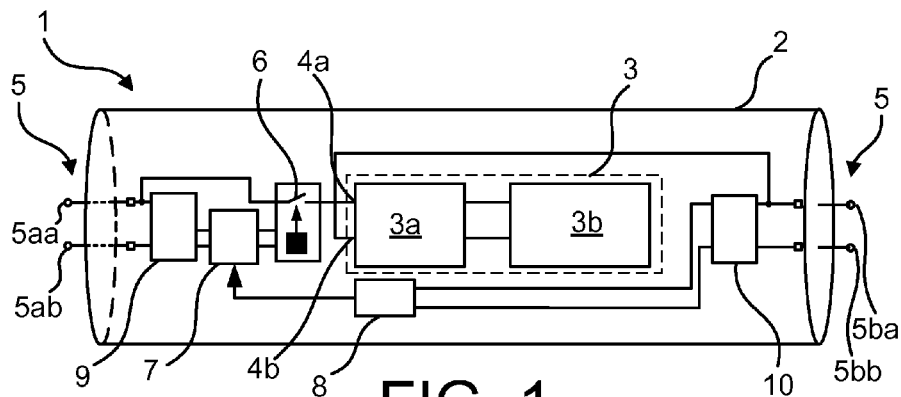
FIG. 1 schematically illustrates a lamp device in accordance with a first embodiment.

FIG. 1 schematically illustrates a lamp device 1 in accordance with a first embodiment. The lamp device 1 comprises a housing 2. At least a part of the housing 2 is light-transparent. The housing 2 is made of an electrically insulting material. The housing 2 may for example be made of glass or transparent/translucent plastics. The housing 2 is provided with a cylindrical shape. However, other shapes are also possible. For example the housing 2 may present a triangular cross section, a rectangular cross section or some other polygonal cross section. The lamp device 1 comprises a lighting module 3. The lighting module 3 includes an LED driver 3a and a LED module 3b. The LED driver 3a includes circuitry for driving the LED module 3b which per se is well-known in the art. The LED module 3b includes one or more LEDs. The one or more LEDs may be inorganic LEDs, OLEDs or another type of solid state light source. Although the lighting module 3 of the present embodiment includes an LED module 3b the lighting module can also include other types of light sources such as an incandescent lamp, a fluorescent lamp or an HID lamp.

The lighting module 3 comprises a first and a second terminal 4a, 4b. The lamp device 1 comprises a first pair of electrical connection pins 5aa, 5ab and a second pair of electrical connection pins 5ba, 5bb (commonly referenced 'pins 5'). The first pair 5aa, 5ab is arranged at a first end of the housing 2. The second pair 5ba, 5bb is arranged at a second end of the housing 2, opposite to the first end of the housing 2. The pins 5 extend through the respective ends of the housing 2 and are hence accessible external to the housing 2. The pins 5 hence form external pins 5. The spatial configuration of the pins 5 is rigid. More specifically the pins 5 on each side maintain a fixed spacing and relative orientation. The pins 5 are arranged to be connected to an electrical socket of a lighting fixture for receiving a supply voltage. The first terminal 4a is connected to the pin 5aa via a switch 6. The second terminal 4b is connected to the pin 5ba. As will be explained in more detail below the circuit between the pin 5aa and the first terminal 4a is open unless the lamp device 1 is correctly inserted to a lighting fixture. The circuit formed between the pin 5ba and the second terminal 4b is however closed independent of a connection state between the device 1 and a lighting fixture.

The switch 6 of the lamp device 1 is operable to connect the pin 5aa to the terminal 4a of the lighting module 3. The state of the switch 6 is controlled by a control circuit 7 described in detail below. The control circuit 7 comprises first and second inputs connected to the first pair of pins 5aa, 5ab. The control circuit 7 comprises a third input connected to a circuit element 8. In the present embodiment the circuit element 8 takes the form of an optocoupler 8. The primary side, i.e. the light emitter, of the optocoupler 8 is connected to the second pair of pins 5ba, 5bb. The secondary side, i.e. the photosensor, is connected to the third input of the control circuit 7. The control circuit 7 is connected to the first pair of pins 5aa, 5ab via a rectifier 9. Similarly, the optocoupler 8 is connected to the second pair of pins 5ba, 5bb via a rectifier 10.

Figure 2:
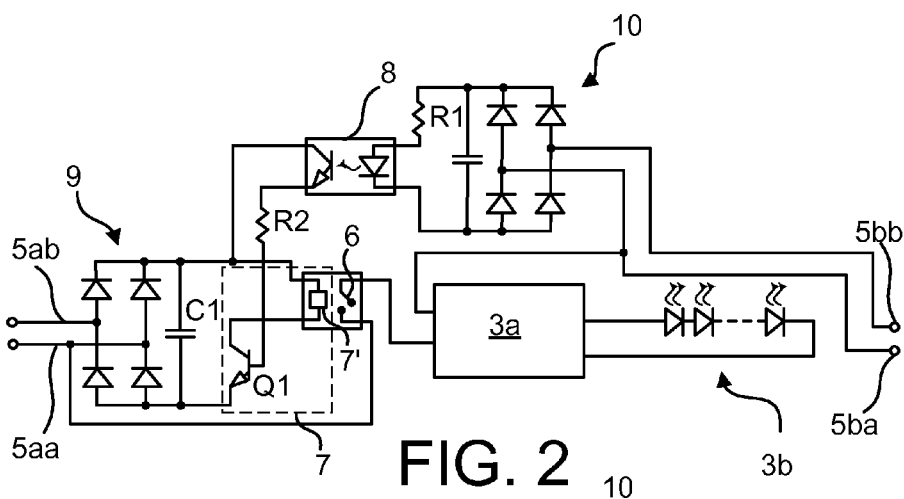
FIG. 2 illustrates a circuit implementation for the first embodiment.

FIG. 2 illustrates a first circuit implementation for the lamp device 1. The control circuit 7 comprises a switch controller 7'. The switch controller 7' is arranged to close the switch 6 in response to a voltage difference between its terminals exceeding a threshold voltage. As illustrated, the switch 6 and the switch controller 7' may be included in a same circuit element forming a relay. The relay may be of a type known per se, such as an electromechanical, an electromagnetic (e.g., Reed relay), electro-thermal (e.g., bimetal) or a solid-state type. The actual value of the threshold voltage may vary between different scenarios and for different lighting fixtures. In the present embodiment the threshold voltage is a voltage sufficient for causing the switch controller 7' to close the switch 6. In some examples the threshold voltage may be zero wherein the switch controller 7' is arranged to close the switch 6 in response to a non-zero voltage difference between its terminals. The switch controller 7' is connected to the rectifier 9 via a transistor Q1. The base of the transistor Q1 is connected to the output of the optocoupler 8. Although Q1 is illustrated as a bipolar junction transistor (BJT) other types of transistors may also be used such as metal-oxide-semiconductor field-effect transistors (MOSFETs) or junction gate field-effect transistors (JFETs).

If a voltage is applied only at the first pair of pins 5aa, 5ab, the transistor Q1 will be turned off. There will be no current for driving the primary side of the optocoupler 8 and inducing a current in the secondary side of the optocoupler 8. Thus no control signal may flow from the optocoupler 8, through the resistor R2 and into the base of the transistor Q1. The switch controller 7' will hence not receive any current causing the switch 6 to close. No main current may hence flow from the pin 5aa to the pin 5ba. Conversely, if a voltage is applied only at the second pair of pins 5ba, 5bb the control circuit 7' will not receive a voltage sufficient for causing the switch 6 to close.

If a first voltage sufficient for causing the control circuit 7' to close the switch 6 (i.e. a voltage exceeding a first threshold voltage) is applied to the first pair of pins 5aa, 5ab and also a second voltage sufficient for causing the optocoupler 8 to provide a control signal to the transistor Q1 (i.e. a voltage exceeding a second threshold voltage) is applied to the second pair of pins 5ba, 5bb the control signal flowing through the resistor R2 may turn on the transistor Q1. The switch controller 7' may then be powered by the first voltage from the first pair of pins 5aa, 5ab. If any of the first pair of pins 5aa, 5ab or the second pair of pins 5ba, 5bb become disconnected from the supply voltage there will not be a sufficient voltage difference for driving the switch controller 7' or the optocoupler 8, respectively. The switch 6 will then open and interrupt a current flow between the pin 5aa and the pin 5ba. Hence, the control circuit 7 and the optocoupler 8 together form circuitry arranged to close the switch 6 on a condition that a voltage difference between the pins of the first pair 5aa, 5ab exceeds the first threshold voltage at a same time as a voltage difference between the pins of the second pair 5ba, 5bb exceeds the second threshold voltage. Correspondingly, this circuitry is arranged to open the switch 6 on a condition that the voltage difference either between the pins of the first pair 5aa, 5ab or the pins of the second pair 5ba, 5bb falls below a respective threshold voltage. This implementation hence enables the lamp device 1 to be inserted and removed from a powered lighting fixture with a reduced risk of electrical shock if touching the pins at a free end of the lamp device 1.

As shown in FIG. 2, the rectifier 9 includes a capacitor C1 for averaging the rectified AC voltage. Also the rectifier 10 includes a capacitor for the same purpose. These capacitors provide a simple way to keep the switch from opening between half-cycles of the rectified AC voltage without the need to make specific adaption of the control circuit 7.

The lamp device 1 may be used in different types of lighting fixtures. As one example the lamp device 1 may be used to retrofit an existing lighting fixture for a fluorescent lamp, i.e. fluorescent tube. Such a lighting fixture may, as known per-se, provide a driving voltage between the opposite ends of the fluorescent tube. It may further include a rapid start circuit which applies a heating voltage between the pins of each pair of connection pins of the fluorescent tube. The heating voltage may heat the filaments of the fluorescent tube. When the lamp device 1 is used in combination with such a lighting fixture the respective filament heating voltages are applied to the first pair of pins 5aa, 5ab and the second pairs of pins 5ba, 5bb. The state of the switch 6 may thus be controlled on the basis of the filament heating voltages. The respective filament heating voltages may be supplied to the lamp device 1 only when all pins 5 are correctly inserted into the lighting fixture. The lighting fixture may be arranged to apply the driving voltage to the pins 5aa and 5ba. A main current between these pins 5aa and 5ba may thus flow only when lamp device 1 is correctly inserted into the lighting fixture.

Figure 3:
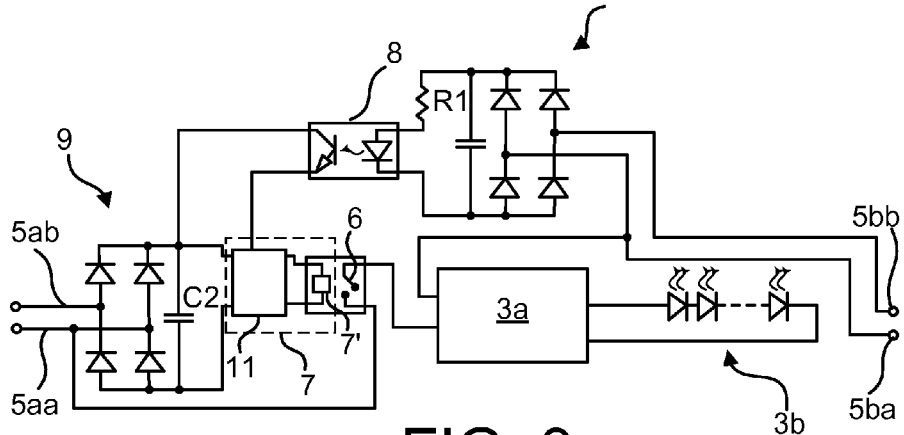
FIG. 3 illustrates an alternative circuit implementation for the first embodiment.

FIG. 3 illustrates a second circuit implementation for the lamp device 1. The second implementation is similar to the first implementation but differs in that the control circuit 7 includes a power converter 11. The power converter 11 is arranged to amplify a voltage received from the rectifier 9 to a level sufficient for closing the switch 6. Similar to the first circuit implementation the control circuit 7 includes an input for receiving the control signal from the optocoupler 8. In FIG. 3 the power converter 11 is an integrated circuit (IC) including an input for receiving the control signal from the optocoupler 8. The power converter 11 may include circuit logic arranged to supply a voltage to the control circuit 7' for closing the switch 6 on a condition that a voltage difference between the inputs of the power converter 11 exceeds a threshold voltage at a same time as a control signal is received at said input of the power converter 11. The power converter 11 may provide a stable operating voltage for the switch controller 7' under various operating conditions. This may be especially advantageous when the lamp device 1 is used to retrofit an existing lighting fixture as discussed above since different ballasts of the starting circuitry thereof may result in varying filament heating voltages. The power amplifier 11 may then amplify low heating voltages to a level sufficient for keeping the switch 6 closed.

Figure 4:
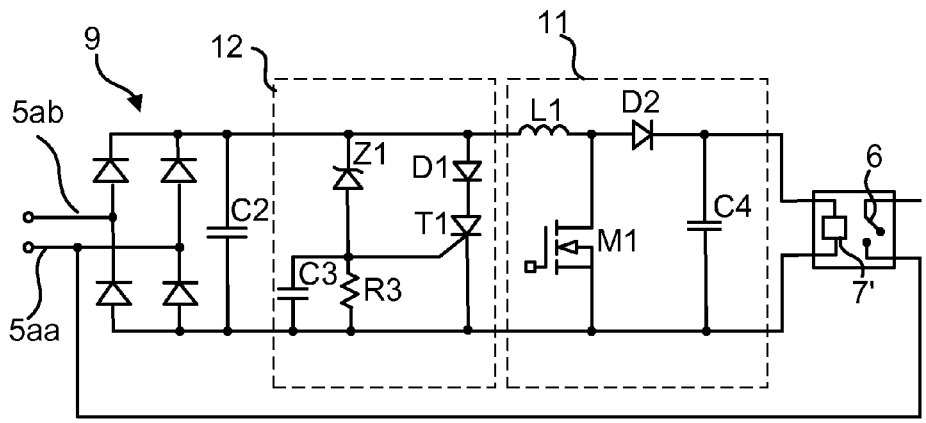
FIG. 4 illustrates an optional safety circuit of a first design.

The power converter 11 may be implemented as a boost converter. An example circuit diagram for a boost converter comprising an inductor L1, a diode D2, a capacitor C4 and a semiconductor switch in the form of a MOSFET M1 is shown in FIG. 4. The boost converter may be arranged to activate only on a condition that the control signal is received from the optocoupler 8. The boost converter may for example include circuitry (e.g. in the form of an IC) arranged to receive the control signal from the optocoupler 8 and provide an enabling signal to the gate of the transistor M1 only on a condition that the IC of the boost circuit receives the control signal from the optocoupler 8. On a condition that no enabling signal is received by the transistor M1, the transistor M1 assumes an off state wherein the boost converter will be inactive.

In lighting fixtures it may occur that one of the contacts in the socket of the lighting fixture into which the lamp device 1 is inserted becomes loose. This may for example happen in older lighting fixtures due to wear and tear. As a result for example the pin 5aa or 5ab may lose electrical contact with the fixture. The lamp device 1 may then not operate correctly. With reference to FIG. 3, if for example the pin 5aa loses the electrical contact with the lighting fixture the main current may flow through the pin 5ab, the first output of the rectifier 9, the power converter 11, the switch controller 7' and the switch 6 via the second output of the rectifier 9. Hence, despite the loose contact at the pin 5aa the switch controller 7' is powered wherein the switch 6 may be closed, the closing resulting in a further current increase. In response the voltage across the capacitor C2 may increase. Eventually the circuit may melt due to over voltage. To deal with this situation the lamp device 1 may be provided with an optional safety circuit. The safety circuit may be arranged between the rectifier 9 and the power converter 11 and be adapted to, in response to a voltage difference between the first and second outputs of the rectifier 9 exceeding a set threshold voltage (i.e. a protection level), clamping the voltage difference.

FIG. 4 illustrates an example implementation of such a safety circuit 12 in combination with the second circuit implementation illustrated in FIG. 3. It is however to be noted that the circuit 12 may also be used in combination with the first circuit implementation. To simplify understanding of the safety circuit 12 only the switch 6, the switch controller 7', the rectifier 9 and the power converter 11 are shown. In FIG. 4 the power converter 11 is implemented as a boost converter. The remaining part of the circuit is identical to that of FIG. 3.

The safety circuit 12 comprises a Zener diode Z1, a resistor R3, a capacitor C3, a thyristor T1 and a diode D1. In the event of e.g. a loose contact at the pin 5aa as described above the voltage over the capacitor C2 will increase. However, in response to the voltage over the capacitor C2 exceeding a threshold voltage set by the Zener diode Z1 the thyristor T1 will be triggered on. Consequently, the main current will flow through D1 and T1 instead of through the power converter 11 and the switch controller 7' and the voltage difference between the outputs of the rectifier 9 may be limited or clamped.

By the switching on of the thyristor T1 there is also provided a current path between the inputs of the power converter 11. By choosing the impedances of D1 and T1 appropriately the voltage drop across D1 and T1 becomes sufficient for driving the power converter 11 and in turn the switch controller 7'. Thereby, the lamp device 1 may produce light even if the pin 5aa loses electrical contact with the lighting fixture.

The safety circuit 12 may also be arranged between the rectifier 10 and the optocoupler 8 wherein the lamp may operate if for example the pin 5ba loses electrical contact with the lighting fixture. In that case it may be advantageous to provide additional diodes in series with the diode D1 to create a sufficient voltage drop for the optocoupler 8 to operate even if the pin 5ba looses electrical contact.

Figure 5:
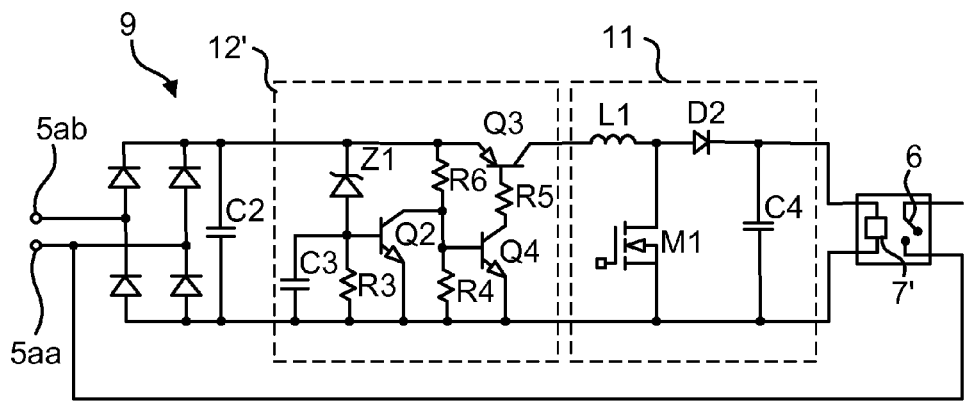
FIG. 5 illustrates an optional safety circuit of a second design.

FIG. 5 illustrates a safety circuit 12' of an alternative design. The safety circuit 12' is similar to the safety circuit 12 but differs in that instead of the diode D1 and the thyristor T1, the safety circuit 12' includes transistors Q2, Q3, Q4 and resistors R4, R5, R6. If the pin 5aa loses its electrical contact with the lighting fixture, the voltage across C2 will increase as explained above with reference to FIG. 4. When the voltage over C2 exceeds the threshold voltage set by the Zener diode Z1, a current will flow into the base of Q2 wherein Q2 will switch on. As a result the base of Q4 will be pulled to ground wherein Q4 will switch off Consequently, Q3 will turn off because the base current to Q3 will be interrupted by Q4. The safety circuit 12' is thus arranged to disconnect an output of the rectifier 9 from the power converter 11 and thus the control circuit in response to the voltage difference exceeding a set threshold voltage.

Figure 6:
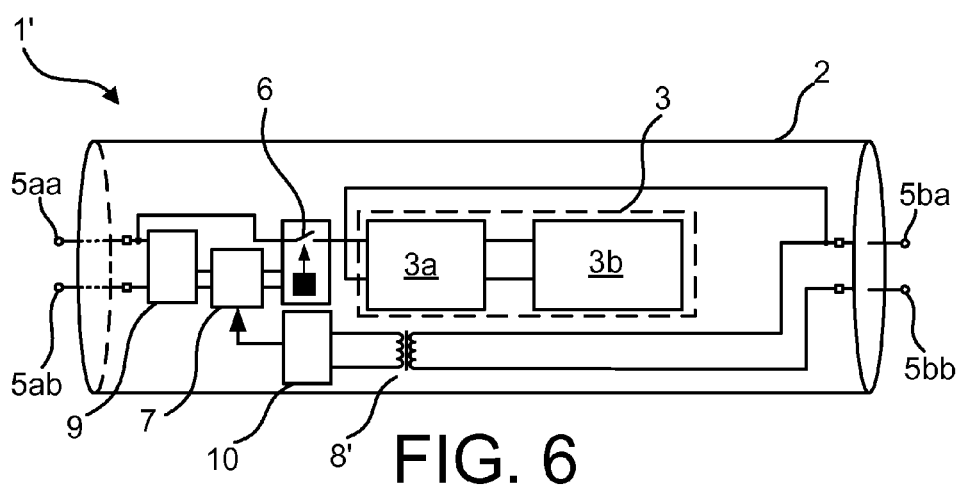
FIG. 6 schematically illustrates a lamp device in accordance with a second embodiment.

FIG. 6 schematically illustrates a lamp device 1' in accordance with a second embodiment. The lamp device 1' is similar to the lamp device 1 but differs in that instead of the optocoupler 8 the lamp device 1' includes a current transformer 8'. The functions of the other parts of the lamp device 1' are analogous to their counterparts in the lamp device 1 as described above. The primary winding of the current transformer 8' is connected to the second pair of pins 5ba, 5bb. The secondary winding is connected to the input of the control circuit 7 via the rectifier 10. The function of the current transformer 8' is analogous to the function of the optocoupler 8. An AC voltage applied at the primary winding of the current transformer 8' via the second pair of pins 5ba, 5bb will induce an AC voltage in the secondary winding of the current transformer 8'. The induced AC voltage is rectified by the rectifier 10 and forms a control signal which is received by the control circuit 7. As described in detail above the control circuit 7 will close the switch 6 on a condition that a voltage difference between the pins of the first pair 5aa, 5ab exceeds a threshold voltage at a same time as the control signal is received from the current transformer 8'.

The person skilled in the art realizes that the present invention by no means is limited to the preferred embodiments described above. On the contrary, many modifications and variations are possible within the scope of the appended claims. For example, the optocoupler 8 and the current transformer 8' both include a primary side and a secondary side which are galvanically insulated from each other. Although this provides added safety other circuit elements which do not include insulation between a primary and secondary side may be used to generate a control signal to the control circuit 7. A control signal may for example be provided to the control circuit 7 by a simple voltage divider or an operative amplifier connected to the second pair of pins. Moreover, although the illustrated embodiments include certain circuit elements other types of circuit elements may also be used. For example a BJT may be replaced by a MOSFET and vice versa. Many of the circuit elements (such as the Zener diodes and the thyristors) may also be replaced by integrated circuit counterparts including circuit logic providing a similar function as the circuit elements. Furthermore, although the lamp devices 1 includes rectifiers 9, 10 they may be omitted in case the lamp device 1 is used in a lighting fixture providing a DC voltage.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lamp device comprising:
a lighting module including a first and a second terminal;
a first and a second pair of connection pins for connecting the lamp device to a lighting fixture, wherein a first connection pin of the second pair is connected to the second terminal;
a switch operable to connect a first pin of the first pair to the first terminal when closed; and
circuitry arranged to close the switch in response to a voltage difference between the pins of the first pair exceeding a first threshold voltage and a voltage difference between the pins of the second pair exceeding a second threshold voltage.

2. The lamp device according to claim 1, wherein the circuitry is further arranged to open the switch in response to the voltage difference between the pins of any of the first pair and the second pair falling below a respective threshold voltage.

3. The lamp device according to claim 1, wherein the circuitry comprises:
a control circuit; and
a circuit element arranged to provide a control signal to the control circuit in response to the voltage difference between the pins of the second pair exceeding the second threshold voltage;
wherein the control circuit is arranged to close the switch in response to the voltage difference between the pins of the first pair exceeding the first threshold voltage at a same time as the control signal is received from the circuit element.

4. The lamp device according to claim 3, wherein the circuit element includes a first part arranged to receive a voltage from the second pair of pins and a second part galvanically insulated from the first part and arranged to provide the control signal to the control circuit.

5. The lamp device according to claim 4, further comprising a first rectifier arranged to receive an AC voltage from the first pair of pins and provide a rectified AC voltage to the control circuit.

6. The lamp device according to claim 5, further comprising a second rectifier arranged to receive an AC voltage from the second pair of pins and provide a rectified AC voltage to the first part of the circuit element.

7. The lamp device according to claim 4, wherein the circuit element is an optocoupler.

8. The lamp device according to claim 4, wherein the circuit element is a current transformer.

9. The lamp device according to claim 5, further comprising a second rectifier arranged to receive an AC control signal from the second part of the circuit element and provide a rectified AC control signal to the control circuit.

10. The lamp device according to claim 6, further comprising a safety circuit associated with the first or the second rectifier and arranged to close a current path between a pair of outputs of the associated rectifier in response to a voltage difference between said pair of outputs exceeding a set threshold voltage.

11. The lamp device according to claim 6, further comprising a safety circuit associated with the first or the second rectifier and arranged to disconnect an output of a pair of outputs of the associated rectifier in response to a voltage difference between said pair of outputs exceeding a set threshold voltage.

12. The lamp device according to claim 1, further comprising a power converter arranged to receive a first voltage from the first pair of pins and provide a second voltage which is larger than the first voltage to the circuitry or the control circuit.

13. The lamp device according to claim 1, wherein the lighting module is a LED module.

14. The lamp device according to claim 1, further comprising a housing, wherein the lighting module is arranged in the housing and the pins of the first and second pairs of pins extends through the housing.

15. A method of operating a lamp device comprising a lighting module including a first and a second terminal and a first and a second pair of connection pins for connecting the lamp device to a lighting fixture, wherein a first connection pin of the second pair of pins is connected to the second terminal, the method comprising:
  monitoring a first voltage difference between the pins of the first pair and a second voltage difference between the pins of the second pair; and
  in response to the first voltage difference exceeding a first threshold voltage at a same time as the second voltage difference exceeding a second threshold voltage, connecting a first pin of the first pair of pins to the first terminal.

16. A lamp device comprising:
  a lighting module including a first and a second terminal;
  a first and a second pair of connection pins for connecting the lamp device to a lighting fixture, wherein a first connection pin of the second pair is connected to the second terminal;
  a switch operable to connect a first pin of the first pair to the first terminal when closed;
  a control circuit; and
  a circuit element arranged to provide a control signal to the control circuit in response to a voltage difference between the pins of the second pair exceeding a second threshold voltage;
  wherein the control circuit is arranged to close the switch in response to a voltage difference between the pins of the first pair exceeding a first threshold voltage at the same time as the control signal is received from the circuit element.

17. The lamp device according to claim 16, wherein the control circuit comprises first and second input connected to the pins of the first pair and a third input connected to the circuit element.

18. The lamp device according to claim 16, wherein the control circuit comprises first and second input connected to the pins of the first pair.

19. The lamp device according to claim 16, wherein the circuit element comprises an optocoupler and the control circuit comprises a switch controller.

20. The lamp device according to claim 16, wherein the switch and the control circuit together form a relay.

\* \* \* \* \*